United States Patent
Kupfmuller

[15] 3,677,094
[45] July 18, 1972

[54] METHOD OF PRODUCING A VOLTAGE EQUAL TO THE SPEED OF ROAD VEHICLES

[72] Inventor: Karl Kupfmuller, Darmstadt, Germany
[73] Assignee: ITT Industries, Inc., New York, N.Y.
[22] Filed: Jan. 18, 1971
[21] Appl. No.: 107,209

[52] U.S. Cl. .............................. 73/503, 73/510, 235/150.2, 235/183, 303/21 R, 303/21 CF
[51] Int. Cl. .......................................... G01p 7/00
[58] Field of Search ................................. 73/503, 510–512; 303/21 R, 21 B, 21 BB, 21 EB, 21 CF; 235/150.2, 183

[56] References Cited

UNITED STATES PATENTS

| | | | |
|---|---|---|---|
| 3,467,443 | 9/1969 | Okamoto | 303/21 |
| 3,401,984 | 9/1968 | Williams et al. | 303/21 |
| 2,942,864 | 6/1960 | Sinora | 73/505 |

Primary Examiner—Richard C. Queisser
Assistant Examiner—Herbert Goldstein
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The instantaneous speed of a road vehicle is measured by measuring the speed derived from a number of revolutions of a wheel and adding thereto the integrated value of measured speed variations. The speed variations are measured by means of the relative motion of an elastically suspended mass in the vehicle. The, thusly, measured speed is then modified by the inclination of the vehicle and its variations as measured by a normal and an astatic pendulum, respectively suspended in the vehicle. These measurements are made during the braking to influence the braking process.

7 Claims, 5 Drawing Figures

INVENTOR
KARL KÜPFMÜLLER

BY Alfred C. Hill

AGENT

METHOD OF PRODUCING A VOLTAGE EQUAL TO THE SPEED OF ROAD VEHICLES

BACKGROUND OF THE INVENTION

The present invention relates to a method of measuring the instantaneous speed of a road vehicle during a certain period of time and more particularly for the purpose of detecting any forthcoming locking of the wheel brakes during a braking process by way of comparing the vehicular speed with the wheel speed of the vehicle, in order to act upon the brake in the sense of preventing the wheels from being locked.

Various methods have already become known for influencing the braking of a vehicle in such a way as to avoid a locking of the wheel brakes. To this end, for example, there is measured the variation of the rotational speed of the vehicle's wheels and, upon exceeding a predetermined value as regards the speed variation, the vehicle's brakes are acted upon in the sense of reducing the braking action. Such a method, however, has proved unsatisfactory within the wide range of the possible vehicular speeds and the various possible friction values between the road surface and the wheel surface.

For exactly measuring the wheel slippage of a vehicle it is necessary, during the braking process, to measure, on one hand, the vehicle speed and, on the other hand, the circumferential speed of the wheels, and to compare them with one another. In so doing, the vehicular speed, i.e. the travelling speed of the vehicle, is determined from the number of rotations of a freely running wheel. To this end, of course, there could be used one of the non-driven wheels, but also the second wheel of the corresponding pair of wheels, however, would have to be of the type to which the brake is not applied, in order to avoid a skidding during the braking process. Accordingly, the brake could only be applied to two wheels which, with respect to the substantially extended braking distance, must be avoided. This problem has been solved by providing a freely running fifth wheel which is alone intended for the speed measurement. Providing an additional wheel on a vehicle, however, involves a considerable additional investment which is economically unreasonable with respect to normal road vehicles.

Finally, it is possible to determine the instantaneous speed of a vehicle by the continuous integration of the acceleration in direction of movement. To this end, however, it is necessary to carry out the integration from the beginning of the movement of the vehicle and to continue the same during the entire time of driving the vehicle. On account of this, however, errors increase as the driving time is extended. Moreover, the influence of the road inclination must be excluded from the acceleration measurement, this requiring an arrangement of the acceleration meter on a gyroscopically stabilized platform. Thus, also in this case, the involved expenditure is unproportionally high.

SUMMARY OF THE INVENTION

It is an object of the present invention to provide a method of measuring the instantaneous speed of a road vehicle during a predetermined period of time, involving a substantially lower expenditure than in the hitherto conventional methods. In particular, there is not required a freely running additional wheel.

The invention is based on a method which is actually known per se, namely, of ascertaining the speed by integration of the relative movement of an inert mass as a function of time. Moreover, the invention is based on the recognition that for the above-mentioned purpose, it is not at all important to ascertain the speed of a road vehicle exactly during all time positions of its movement, but that measuring the instantaneous speed may be restricted to a very specific period of time. In fact, for controlling a braking process, it is only necessary to measure the speed from a time position lying shortly ahead of the beginning of the braking to the end of the breaking.

A feature of the present invention is to provide a method of measuring the instantaneous speed of a road vehicle during a predetermined time comprising the steps of measuring the speed of the vehicle at the beginning of the period of time from the revolutions of one wheel of the vehicle; storing the speed measurement; measuring speed variations of the vehicle during the period of time; integrating the speed variations measurement; and adding the stored speed measurement and the integrated speed variations measurements.

Accordingly, for ascertaining the speed at the beginning of the measurement, there is taken the number of revolutions of one of the wheels to which the brake is to be applied. This is possible owing to the fact that the wheel rotation slippage shortly before the beginning of a braking process is approximately zero, i.e. that the circumferential speed of the wheel, at this particular time position, is equal to the travelling speed. Shortly before applying the brake, the vehicle is neither accelerated nor retarded, so that the measurement may, without further ado, be based on the thusly obtained value. The thusly obtained speed value is stored for the time of the measurement, and to this value there is added the speed as derived from the integration of the subsequently measured speed variations. In this way it is possible, during a predetermined period of time, e.g. during the braking process, to determine the instantaneous speed of the vehicle. From the difference between the thusly obtained vehicular speed and the circumferential speed of the wheels during the braking process, it is possible to continuously determine the wheel slippage which can be used for influencing the braking process. Namely, upon exceeding a predetermined speed difference, hence a predetermined slippage, the brake device can be acted upon in the sense of reducing the brake pressure requirements.

The speed variation values necessary for the measurement can be derived in a relatively simple way from the relative movement of a mass which is flexibly supported and capable of moving in the direction of the longitudinal axis of the vehicle. This mass is preferably retained in its normal position until the measurement is initiated, and is then released for the time of the measurement only. In order to avoid the high expenditure for a gyroscopically stabilized platform for the flexibly supported mass it is proposed, in accordance with a further embodiment of the invention, to take into consideration, when measuring the relative movement of the mass, the error resulting from the road inclination. In a simple way this is effected with the aid of a damped pendulum which, at the beginning of the measurement, is retained in its assumed position. The deviation of the angle of inclination during the measurement, from the value as obtained at the beginning of the measurement, is measured, in accordance with a further embodiment of the invention, with the aid of a non-damped, astatic pendulum.

Accordingly, the expenditure involved in the method of measuring the instantaneous travelling speed of a vehicle, according to the invention, is rather low. To this end there is only required an inert mass which is flexibly supported in direction of the vehicle axis, as well as one damped normal, and one non-damped astatic pendulum. Both the movement of the mass and the movement of the pendulums are measured in known ways, and preferably converted into electrical quantities from which, in a simple way, there may then be formed a value which is proportional to the speed of the vehicle.

BRIEF DESCRIPTION OF THE DRAWING

Above-mentioned and other features of objects of this invention will become more apparent by reference to the following description taken in conjunction with the accompanying drawing in which.

DESCRIPTION OF THE PREFERRED EMBODIMENT

Figure 1:
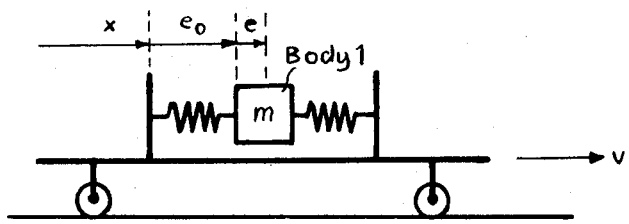
FIG. 1 schematically shows the deflection of a mass flexibly supported in the vehicle out of its normal position.

Aboard the vehicle there is supported a body having the mass m which is capable of being displaced in the longitudinal direction x of the vehicle, with body 1 (mass m) being flexibly bound to a normal position, as is schematically shown in FIG. 1. Deflection of the mass m out of its normal position is assumed to be given by the coordinate e. The coordinate $$x = vt \quad (1)$$

is assumed to indicate the momentary location or position of the vehicle, with v being indicative of the car speed. The equation of movement relating to the mass m will then read as follows:

$$\frac{m \cdot d^2(X + e_0 + e)}{dt^2} + \frac{d^{de}}{dt} + s \cdot e = 0 \quad (2)$$

wherein s is the rigidity of the flexible support and d a damping constant. When indicating by $$w = \frac{de}{dt} \quad (3)$$

the fastness at which the mass is being moved, and when inserting according to Equation (1) the speed v of the car, the following will result from Equation (2):

$$y = -w - \frac{d}{m}\int_{-\infty}^{t} w \cdot dt - \frac{s}{m}\int_{-\infty}^{t} dt \int w \cdot dt \quad (4)$$

Accordingly, the travelling or driving speed can be continuously obtained with the aid of two integrators from the fastness of velocity w.

Here, however, two basic deficiencies are considered to be a disadvantage:

1. The evaluation according to Equation (4) requires that the integrations be continued during the entire driving time of the car, hence, from the beginning of the drive onwards. Owing to this, the error quantities increase as the driving time is extended.

2. The simple relationship according to Equation (4) is only applicable to an exactly horizontal road surface. In the case of a (downward) incline of the road at the angle j the component g sin j of the gravitational acceleration g as falling into the x-direction, will appear as a disturbance quantity. Conventional technical solutions aimed at avoiding this disturbance variable or quantity require a relatively high investment in gyroscopically stabilized platforms and computers.

These two deficiencies are avoided by the present invention, first of all, in that the travelling or driving speed $v_a$ is determined immediately before the beginning of each braking process in a different way and independently, and is included in the continuous or progressive ascertainment of the driving speed. According to the invention there is used to this end, the measurement of the number of rotations n of one of the wheels to which the brake system is to be applied. The wheel rotation slippage actually becomes approximately zero before the beginning of a braking process, i.e., the circumferential speed of the wheel will become at this particular time position equal to the driving speed, so that $$v_a = 2\pi rn \quad (5)$$

wherein r designates the effective radius of the wheel. The instantaneous number of revolutions n can be easily measured in accordance with well-known methods, such as, e.g., via a live or running toothed wheel and magnetic (voltage generator) or optical sensing elements.

If now $v_a$ at the time position $t = 0$ is known, then the speed v during the following braking can be obtained in accordance with Equation (4) by way of integrations starting at the same time position, and only needing to extend over the duration of the braking process, hence, during a relatively very short period of time. Accordingly, now the following is applicable $$v = v_a - w - \frac{d}{m}\int_0^t w dt - \frac{s}{m}\int_{0\phi}^t dt \int_{0\phi}^t w dt \quad (6)$$

The starting point $t = 0$ is determined by the first movement of the brake pedal, in that the mass m is retained, until this particular time position, in its normal position $e = 0$, and is only released upon actuating the brake pedal.

Figure 2:
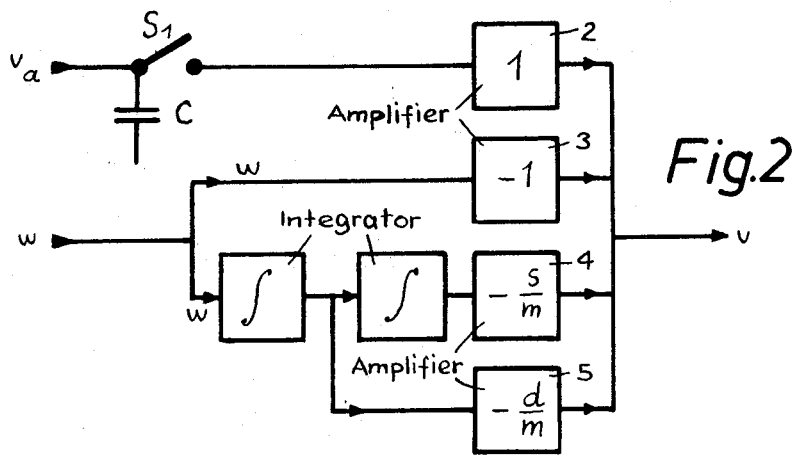
FIG. 2 is a block diagram showing the processing of the signals.

The scheme relating to the signal processing as resulting therefrom is shown in FIG. 2. The quantities $v_a$ and w are represented in accordance with known methods by analog electrical voltages. The switch S1 is closed by the brake pedal. Capacitor C stores the voltage analog of $v_a$ during the braking process. Summing up of the four output voltages from amplifier 2 having a gain of one and no inversion, amplifier 3 having a gain of one and inversion, amplifier 4 having a gain of s/m and inversion and amplifier 5 having a gain of d/m and inversion will lead, according to Equation (6), at each time position following the initiation of the braking process, to the voltage which is an analog value of the instantaneous driving speed v. Upon releasing the brake pedal, switch $S_1$ is opened and m is retained at its normal position. Consequently, w and v become zero.

When the road 6 inclines at the angle j it follows that a gravitational component mg sin j still has an accelerating effect upon the mass m in the direction x. This component is to be inserted in equation (2). In Equation (6) this component appears as a loss in the driving speed v amounting to $$\Delta v = g\int_{-\infty}^{t} \sin j\, dt \quad (7)$$

The driving speed value as obtained according to FIG. 2, must be corrected by this amount. To this end, the road incline would have to be measured continuously.

Figure 3:
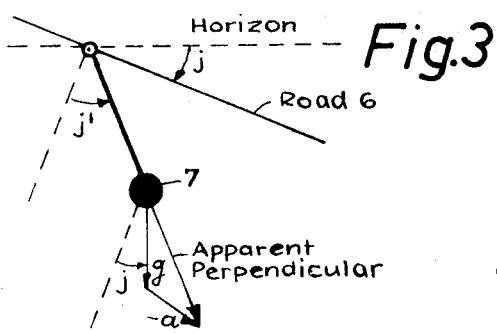
FIG. 3 schematically shows the effect of a road inclination upon the movement of a pendulum capable of moving in the median plane of the vehicle.

A simple pendulum 7 capable of moving in the median plane of the vehicle is unsuitable to this end. A pendulum of this kind will always adjust itself in accordance with the so-called apparent perpendicular as is determined by the sum of gravitational acceleration g and car acceleration $a = d^2x/dt^2$, as is illustrated in FIG. 3. Pendulum 7, therefore, does not provide the desired angle of inclination, but the angle $j^1$ as constituted by the apparent perpendicular, and this is the reason why in such measurements there are used gyroscopically stabilized platforms which are not influenced by the travelling acceleration. According to the present invention it is also possible to achieve a substantial simplification in that during the measurement, the period of time prior to the application of the brake is treated separately from the braking process itself. Because in the time position where the initial speed $v_a$ of the vehicle is being measured in accordance with the foregoing, also the travel acceleration a is negligibly small, so that a simple pendulum is only acted upon by gravitational acceleration, thus, causing the apparent perpendicular to coincide with the actual (real) perpendicular (vertical). Accordingly, at this particular time position the angle of inclination j, as a deflection of the pendulum, may be taken off directly from its normal position, e.g., via a potentiometer coupled to a DC voltage source. In the known manner, of course, the pendulum may be provided with a suitable damping, so that the pendulum deflection will be sufficiently quick in following the road incline. Similarly as in the case $v_a$, the thusly determined value is now retained during the braking period, by way of being stored in capacitor $C_1$.

The angle j may now vary during the braking process and may thus differ from $j_a$. During this braking process, therefore, the following is assumed to be applicable $$j = j_a + \Delta j \quad (8)$$

Figure 4:
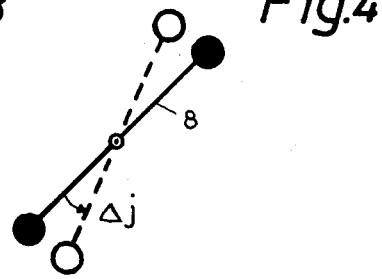
FIG. 4 shows the relationship with respect to an astatic pendulum.

According to the invention, the variation $\Delta j$ of the angle of inclination is measured with the aid of an astatic pendulum 8 shown in its FIG. 4 by way of example. It is supported in its center of gravity, so that the travel acceleration will remain ineffective, and there is only indicated the rotation $\Delta j$ around the transverse axis. This may be taken off via potentiometers coupled to a DC voltage source, taking care that the friction torque is sufficiently small with respect to the moment of inertia.

Figure 5:
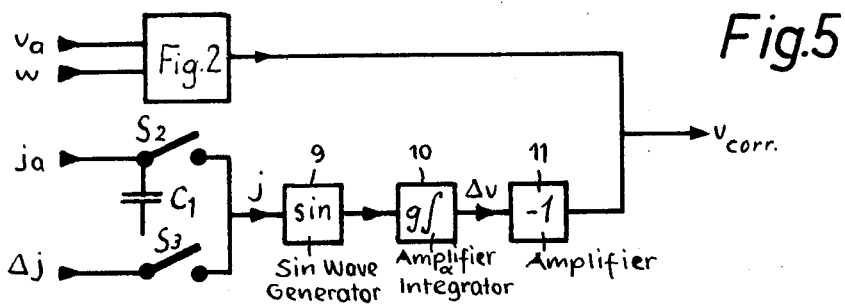
FIG. 5 shows an overall block diagram for processing the signals according to the principles of the present invention.

A block diagram of the entire described arrangement according to the invention is shown in FIG. 5. From $v_a$ and w there is derived the quantity (variable) v according to FIG. 2. Upon commencement of the braking, both the switches $S_2$ and $S_3$ are closed. The retained initial value $j_a$ of the angle of inclination is added to the continuously ascertained value $\Delta j$ according to Equation (8). After forming the sine-function of $j$ in generator 9, upon multiplication with the gravitational acceleration $g$, and integration in amplifier and integrator 10 there will be obtained the value $\Delta v$ according to Equation (7). The value $\Delta v$ is applied to amplifier 11 having a gain of one and inversion. The output of amplifier 11 is subtracted from v which will result in the corrected travelling or driving speed $v_{corr}$.

Evaluation of the operations shown in the analog scheme, of course, may also be carried out in a known way digitally. The mass m may also be supported in any other than the way shown, e.g., on an elastic or flexible diaphragm, or else a damped pendulum may be used to this end. The fastness w may be measured directly, e.g., with the aid of a permanent magnet serving as the moving mass immersed in a coil.

The method according to the invention is in no way restricted to the measurement of the speed of a road vehicle for the purpose of effecting anti-skid brake control only. For example, also independently of a braking process, a measurement could be tripped by depressing a button, with this measurement then being carried out during a predetermined adjustable period of time, with the measured value being indicated. Instead of the vehicular speed, or in addition thereto, there could also be indicated the slippage. This, for example, is of interest in cases of considerable acceleration and a low static friction between the wheel surface and the road surface.

While I have described above the principles of my invention in connection with specific apparatus it is to be more clearly understood that this description is made only by way of example and not as a limitation to the scope of my invention as set forth in the objects thereof and in the accompanying claims.

I claim:

1. A method of producing a voltage equal to the instantaneous speed of a road vehicle having a braking system during a predetermined period of time comprising the steps of:
   producing a first voltage proportional to the speed of said vehicle at the beginning of said period of time from the revolutions of one wheel of said vehicle;
   storing said first voltage;
   producing a second voltage proportional to the speed of a body relative to said vehicle, said body being supported in said vehicle by a flexible body support and capable of moving in the direction of the longitudinal axis of said vehicle;
   inverting said second voltage to produce a third voltage;
   integrating said second voltage for said period of time to produce a fourth voltage;
   multiplying said fourth voltage by a first factor to produce a fifth voltage, said first factor being equal to the damping constant of said body support divided by the mass of said body;
   inverting said fifth voltage to produce a sixth voltage;
   integrating said fourth voltage for said period of time to produce a seventh voltage;
   multiplying said seventh voltage by a second factor to produce an eighth voltage, said second factor being equal to the rigidity of said body support divided by the mass of said body;
   inverting said eighth voltage to produce a ninth voltage; and
   algebraically adding said stored first voltage, said third voltage, said sixth voltage and said ninth voltage together to produce a tenth voltage equal to said instantaneous speed when said vehicle is traveling on a horizontal surface.

2. A method according to claim 1, further including the steps of:
   producing an eleventh voltage proportional to the angle of inclination between said longitudinal axis and a horizontal line at the beginning of said period of time;
   storing said eleventh voltage;
   producing a twelfth voltage proportional to deviations of said angle of inclination during said period of time;
   algebraically adding said stored eleventh voltage and said twelfth voltage to produce a thirteenth voltage;
   producing a fourteenth voltage equal to the sine-function of said thirteenth voltage;
   integrating said fourteenth voltage with respect to time during said period of time to produce a fifteenth voltage;
   multiplying said fifteenth voltage by the value of gravitational acceleration to produce a sixteenth voltage;
   inverting said sixteenth voltage to produce a seventeenth voltage; and
   algebraically adding said seventeenth voltage to said tenth voltage to obtain an output voltage equal to said instantaneous speed of said vehicle regardless of the inclination of the surface upon which said vehicle is traveling.

3. A method according to claim 2, wherein
   said step of producing said eleventh voltage includes the step of
      producing said eleventh voltage by the swing of a pendulum in the median plane of said vehicle, said pendulum being retained in its position assumed at the beginning of said period of time.

4. A method according to claim 3, wherein
   said step of producing said twelfth voltage includes the step of
      producing said twelfth voltage by the swing of a non-damped astatic pendulum capable of swinging in the median plane of said vehicle.

5. A method according to claim 4, wherein
   said period of time is the time required for each braking process of said vehicle.

6. A method according to claim 5, wherein
   said steps of producing said first voltage, of producing said second voltage, of producing said eleventh voltage and of producing said twelfth voltage are actuated upon start of each braking process, but prior to the responding of said brake system to enable said output voltage to influence each braking process.

7. A method according to claim 1, wherein
   said body is normally retained in its normal position and is released during said period of time.

* * * * *